(12) United States Patent
Gottinger et al.

(10) Patent No.: US 9,857,025 B2
(45) Date of Patent: Jan. 2, 2018

(54) SELF-PROPELLED WORKING DEVICE

(71) Applicant: VIKING GmbH, Langkampfen (AT)

(72) Inventors: Clemens Gottinger, Kufstein (AT); Gerhard Auer, Lofer (AT); Herbert Eidherr-Schmid, Kufstein (AT)

(73) Assignee: Viking GmbH, Langkampfen (AT)

( * ) Notice: Subject to any disclaimer, the term of this patent is extended or adjusted under 35 U.S.C. 154(b) by 291 days.

(21) Appl. No.: 14/859,315

(22) Filed: Sep. 20, 2015

(65) Prior Publication Data

US 2016/0084436 A1 Mar. 24, 2016

(30) Foreign Application Priority Data

Sep. 20, 2014 (EP) .................................. 14003267

(51) Int. Cl.
*F16P 3/20* (2006.01)
*F16P 3/08* (2006.01)
*A01D 34/00* (2006.01)

(52) U.S. Cl.
CPC .............. *F16P 3/08* (2013.01); *A01D 34/008* (2013.01); *A47L 2201/00* (2013.01); *A47L 2201/04* (2013.01)

(58) Field of Classification Search
CPC .... A47L 2201/00; A47L 2201/34; A47L 9/28; A47L 9/12; A47L 9/009; A47L 11/40; A47L 11/4052; A47L 11/4061; B62B 1/06; B62B 1/00; B62B 1/004; A01D 34/00; A01D 34/74; A01D 75/18; A01D 75/20

USPC ...... 307/9.1, 10.1, 66, 64, 82, 326; 414/400, 414/401; 460/114; 134/6, 172, 21, 19
See application file for complete search history.

(56) References Cited

U.S. PATENT DOCUMENTS

| | | | | |
|---|---|---|---|---|
| 5,830,313 | A * | 11/1998 | Smith | ................... E04G 23/006 156/717 |
| 6,176,150 | B1 * | 1/2001 | Fogeling | ................ B60K 20/02 74/473.21 |
| 2002/0109394 | A1 * | 8/2002 | Phillips | ................. E04G 23/006 299/36.1 |
| 2004/0255425 | A1 * | 12/2004 | Arai | ......................... A47L 5/28 15/300.1 |

(Continued)

FOREIGN PATENT DOCUMENTS

| | | |
|---|---|---|
| DE | 20 2010 008414 U1 | 12/2011 |
| EP | 2 412 219 A1 | 2/2012 |

(Continued)

*Primary Examiner* — Rexford Barnie
*Assistant Examiner* — Jagdeep Dhillon
(74) *Attorney, Agent, or Firm* — Gudrun E. Huckett

(57) ABSTRACT

A self-propelled working device has a housing and an operating element arranged on the housing. A pivot bearing is arranged on the housing. A lid is pivotably arranged on the housing so as to pivot about a pivot axis of the lid, wherein the lid has a closed state in which the lid covers the operating element and an open state enabling access to the operating element. The lid has a bearing section interacting with the pivot bearing, wherein the bearing section and the pivot bearing define the pivot axis of the lid. A first Hall sensor is arranged in the housing and monitors a pivot position of the lid. A first magnet is arranged on the bearing section of the lid. The first magnet rotates when the lid pivots about the pivot axis and the magnetic field of the first magnet is detected by the first Hall sensor.

18 Claims, 5 Drawing Sheets

(56) References Cited

U.S. PATENT DOCUMENTS

| | | | | |
|---|---|---|---|---|
| 2004/0262019 A1* | 12/2004 | Hubbard | ............... | E21B 7/24 173/1 |
| 2006/0276240 A1* | 12/2006 | Spechtel | ............... | A01F 12/30 460/85 |
| 2007/0136981 A1* | 6/2007 | Dilger | ............... | A47L 9/009 15/319 |
| 2007/0269300 A1* | 11/2007 | Menard | ............... | B62B 3/001 414/444 |
| 2009/0194302 A1* | 8/2009 | Vergara | ............... | A01B 59/004 172/439 |
| 2012/0055508 A1* | 3/2012 | Van Den Berg | ............... | A01K 1/01 134/6 |
| 2014/0144467 A1* | 5/2014 | Merz | ............... | A47L 11/4055 134/6 |
| 2014/0345957 A1* | 11/2014 | Bernstein | ............... | B60R 11/00 180/21 |
| 2015/0000068 A1* | 1/2015 | Tsuboi | ............... | A47L 9/009 15/319 |
| 2015/0075575 A1* | 3/2015 | Karlovich | ............... | A63B 69/0064 135/66 |

FOREIGN PATENT DOCUMENTS

| | | | | |
|---|---|---|---|---|
| EP | 2 417 894 A1 | 2/2012 | | |
| KR | EP 2417894 A1 * | 2/2012 | ............... | A47L 5/28 |
| SE | WO 2013125992 A1 * | 8/2013 | ............... | A01D 34/008 |
| SE | WO 2013125995 A1 * | 8/2013 | ............... | A01D 75/18 |
| WO | 02/071175 A1 | 9/2002 | | |

* cited by examiner

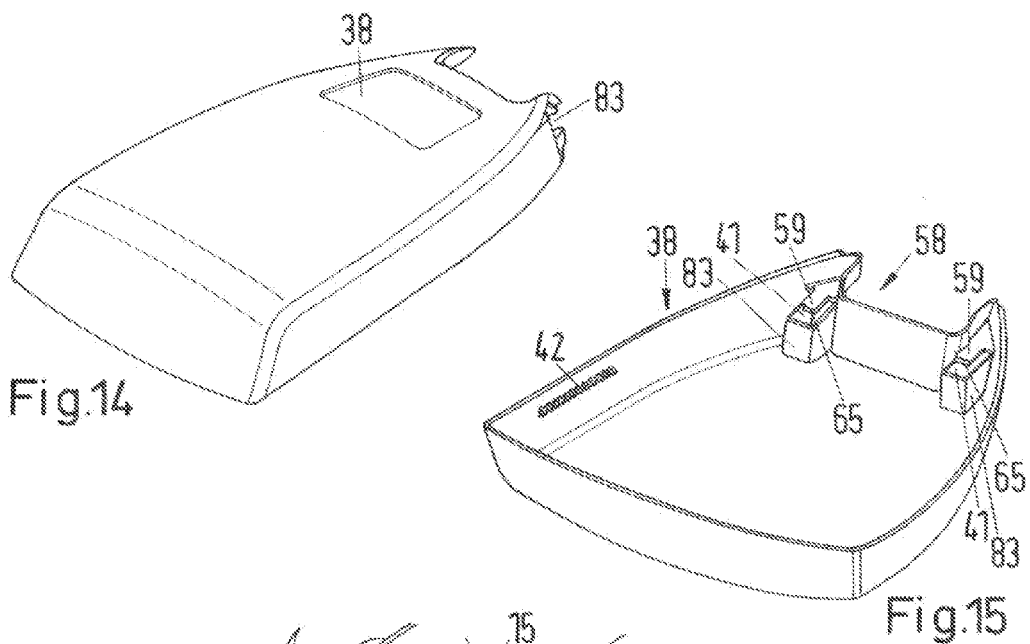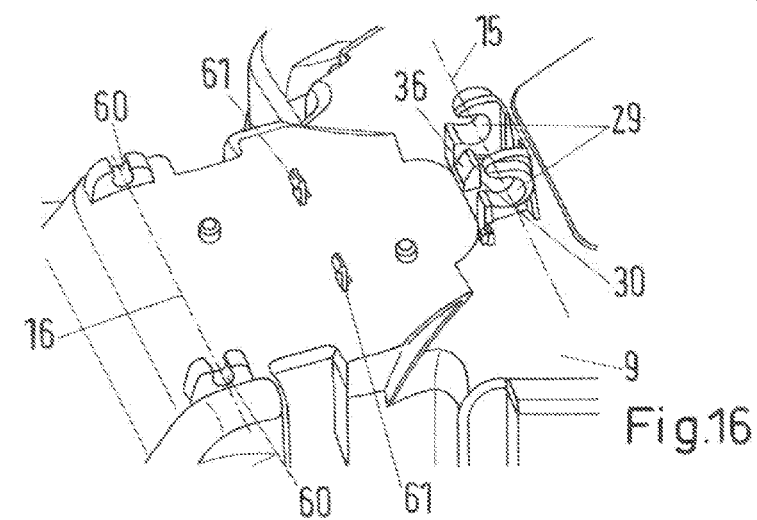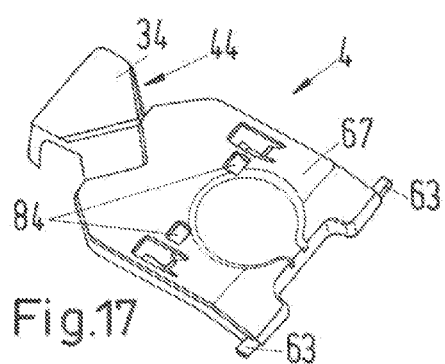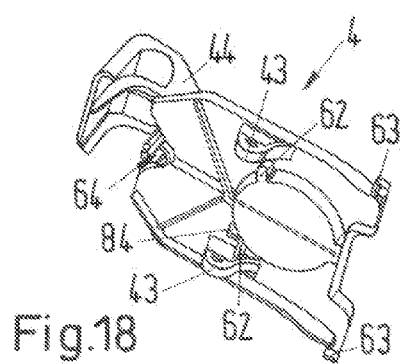

SELF-PROPELLED WORKING DEVICE

BACKGROUND OF THE INVENTION

The invention relates to a self-propelled working device comprising at least one propelling drive and further comprising a housing, wherein on the housing at least one lid is pivotably supported that, in the closed state, covers at least one operating element, wherein the lid comprises a bearing section that is arranged in the area of the pivot axis of the lid and on which at least one pivot bearing for the lid is arranged.

EP 2 417 894 A1 discloses a self-propelled working device, i.e., a self-propelled vacuum cleaner. The vacuum cleaner comprises a receptacle for dirt which is arranged in space that is closed by a lid. In order to recognize the open position of the lid, a switch is provided which is actuated when the lid is completely open. In this context, a hinged bracket of the lid is acting on the switch and projects into the interior of the housing of the vacuum cleaner. Through the opening in the housing through which the hinged bracket is projecting into the interior, dirt can enter the housing. Moreover, the switch can detect only the completely open position of the lid. A partially open position of the lid cannot be detected.

SUMMARY OF THE INVENTION

It is an object of the present invention to provide a self-propelled working device of the aforementioned kind that has a reduced susceptibility for soiling and enables detection of a partially open position of the lid.

In accordance with the present invention, this is achieved in that in the housing at least one first Hall sensor is arranged for monitoring the pivot position of the lid and in that on the bearing section of the lid at least one first magnet is arranged which rotates upon pivoting of the lid about the pivot axis of the lid and whose magnetic field is detected by the first Hall sensor.

It is provided that the pivot position of the lid is monitored by a first Hall sensor. The Hall sensor is arranged in the housing of the working device and is therefore protected from becoming soiled. In the area of the Hall sensor, the housing can be completely closed because the Hall sensor enables contactless detection of the pivot position of the lid. On the bearing section of the lid at least one first magnet is arranged which upon pivoting of the lid about the pivot axis of the lid rotates and whose magnetic field is detected by the first Hall sensor. Due to the arrangement of the first magnet on the bearing section of the lid, the spacing between the first magnet and the Hall sensor does not change or changes only minimally upon pivoting of the lid. The spacing can be comparatively small in this context. Accordingly, the magnetic field of the first magnet in any pivot position of the lid can be detected and evaluated by the first Hall sensor. Pivoting of the first magnet changes the orientation of the magnetic field and thus the field strength of the magnetic field of the first magnet that is measured by the Hall sensor. However, the magnetic field of the first magnet is detectable in any position of the lid by the first Hall sensor. Also, the detection of a partially open lid is possible with this arrangement.

In a preferred embodiment, at least two first Hall sensors are arranged in the housing which detect the magnetic field of the first magnet with redundance. Since at least two Hall sensors detect the magnetic field of the first magnet, a defect of one of the two first Hall sensors can be detected in a simple way.

Advantageously, a stop switch is arranged on the housing. The stop switch serves to stop the working device. When the working device comprises a tool, the tool can be stopped alternatively or additionally upon actuation of the stop switch. The position of the stop switch is advantageously monitored by a second Hall sensor arranged within the housing. On the stop switch, advantageously at least one second magnet is secured whose magnetic field is detected by the second Hall sensor. The second Hall sensor is also protected from becoming soiled by being arranged in the housing. The stop switch can be arranged completely outside of the housing because the magnetic field of the second magnet is detectable through the wall of the housing by the second Hall sensor. Preferably, at least two second Hall sensors are provided which redundantly detect the magnetic field of the second magnet. Accordingly, a defect of one of the two second Hall sensors can be detected in a simple way. The second magnet is positioned relative to the first magnet advantageously at a spacing of less than 5 cm. In this way, a minimal size of the working device is provided. The stop switch can be arranged at a minimal spacing relative to the bearing section of the lid and thus relative to the operating elements which are covered by the lid. Upon actuation of the stop switch advantageously the spacing of the second magnets to the second Hall sensor is changed, in particular reduced. Since the first magnet upon pivoting of the lid is pivoted and the second magnet is moved away from or toward the second Hall sensor, different signal strengths and signal changes are measured at the first Hall sensor and at the second Hall sensor. Because the signals are different, the two magnets and also the two Hall sensors each can be arranged at very minimal spacing relative to each other. Advantageously, the first Hall sensor and the second Hall sensor are arranged on a common printed circuit board in the housing. In this way, a simple configuration results. Only a single printed circuit board is required for the sensors.

Advantageously, the stop switch has a section which at least partially engages across the bearing section of the lid. In this way, the pivot bearing of the lid is at least partially covered. The pivot bearing of the lid comprises advantageously a receptacle on the housing that has an opening by means of which the bearing section can be mounted in the receptacle. The stop switch covers the opening advantageously at least partially. By means of the stop switch, securing of the bearing section in the receptacle is achieved.

Advantageously, the working device comprises a movably supported cover whose position can be monitored by means of a detection device which is arranged in the housing. The detection device can serve to determine whether the working device has hit an obstacle. The detection device comprises advantageously at least one third Hall sensor. The third Hall sensor serves in particular to detect the spacing of the cover relative to the housing. On the cover advantageously a third magnet is arranged whose magnetic field is detected by the Hall sensors of the detection device. Particularly preferred, the detection device comprises a third, a fourth, and a fifth Hall sensor. Accordingly, the movements of the cover can be detected with satisfactory precision in all directions. It is not only detected whether the working device has hit an obstacle but also in which direction this obstacle is located. Advantageously, the at least one third Hall sensor is arranged on the common printed circuit board of the first Hall sensor and the second Hall sensor. Also, a fourth and/or a fifth Hall sensor of the detection device are advantageously arranged on the common printed circuit board. In this way, only a single printed circuit board is required for the Hall sensors. By arranging the first magnet on the pivot bearing of the lid, all Hall sensors can be arranged in comparatively close proximity to each other so that the printed circuit board can be designed with minimal dimensions.

Advantageously, the bearing section is pivotably supported by at least two bearing locations and the first magnet is arranged between the two bearing locations. In this way, the position of the magnet is comparatively precisely determined. A simple configuration results when the bearing section comprises a recess in which the first magnet is arranged. The bearing section is in particular designed as a bearing shaft. The lid is advantageously supported in a springy fashion so as to be loaded in the direction of its open position. When the lid is opened only partially, the lid is adjusted by the spring into the completely open position. In this way, it can be substantially avoided that the lid gets stuck in intermediate positions. For the operator it is therefore easily recognizable when the lid is not completely closed. For defining the completely open position of the lid, on the bearing section a stop is advantageously formed which is interacting with the housing. Between the completely closed position and the completely open position, the lid expediently travels across a pivot angle of approximately 70° to approximately 110°. In case the lid is not completely closed, the propelling drive and/or the drive device for at least one tool of the working device is switched off advantageously. In this way, it is avoided that the working device, in case the lid is not completely closed, will move or that the drive device drives the at least one tool of the working device. The lid is in particular designed for covering operating elements of the working device. When the operator has opened the lid in order to actuate the operating elements, the propelling drive and the drive device are advantageously switched off.

BRIEF DESCRIPTION OF THE DRAWING

FIG. 14 is a perspective view of the second part of the lid.

FIG. 15 is another perspective view of the second part of the lid.

FIG. 16 is a perspective view of the housing in the area of the stop switch.

FIG. 17 is a perspective illustration of the stop switch.

FIG. 18 is another perspective illustration of the stop switch.

DESCRIPTION OF THE PREFERRED EMBODIMENTS

Figure 1:
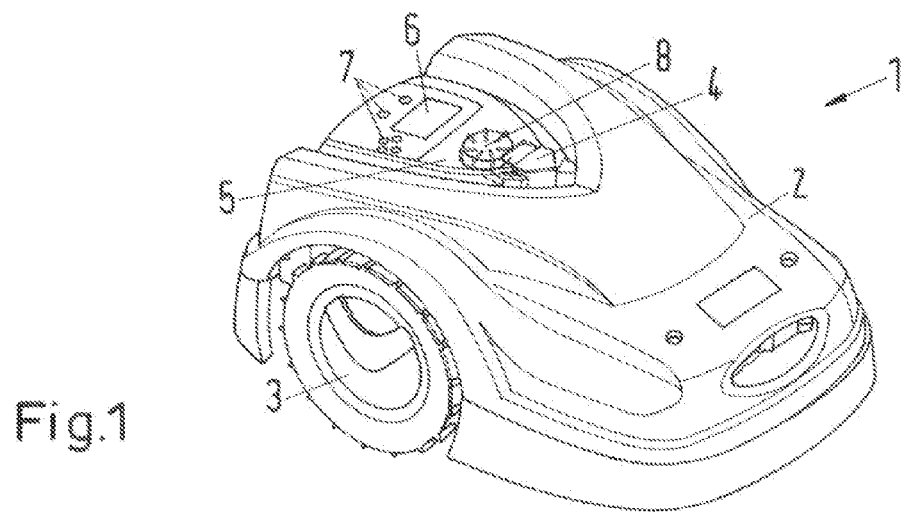
FIG. 1 shows a perspective illustration of a working device.

FIG. 1 shows a self-propelled working device 1 that is designed as a lawnmower. The self-propelled working device 1 can also be a different kind of self-propelled working device, for example, a vacuum cleaner or the like. The working device 1 is designed as an autonomous working device. It moves automatically across the surface to be worked on, for example, a lawn, without an operator having to be present. The working device 1 comprises a cover 2. In the area of a cutout of the cover 2, a stop switch 4 and a lid 5 are arranged. In the embodiment, the lid 5 is transparent. The lid 5 covers a display 6 as well as operating elements 7 arranged adjacent to the display 6. A further operating element 8 serves for adjusting the cutting height and is also arranged underneath the lid 5.

Figure 2:
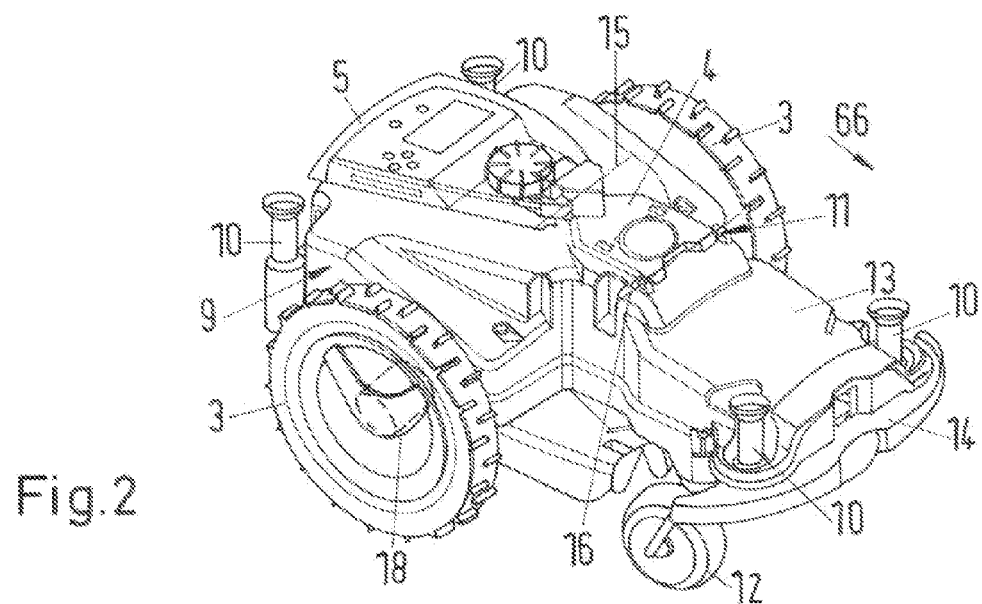
FIG. 2 shows the working device of FIG. 1 with the cover removed.

As shown in FIG. 2, the working device 1 has two wheels 3 that have a relatively large outer diameter and that move the working device 1. The wheels 3 are driven by a propelling drive 18. In the embodiment, each wheel 3 has its own propelling drive 18 that is, for example, an electric motor, optionally with an additional gearbox. The working device 1 comprises also a front wheel 12 of a smaller diameter that is pivotably supported and therefore can align itself in the travel direction. The working device 1 comprises a housing 9 on which the cover 2 is movably supported. In the embodiment, for movable support of the cover 2 four spring elements 10 are provided. The housing 9 comprises a housing top part 13 and a housing bottom part 14 and is substantially of a closed configuration. In this way, soiling of the interior of the housing 9 is substantially prevented. On the side of the housing top part 13 that is facing upwardly in operation, the lid 5 and the stop switch 4 are pivotably supported. The stop switch 4 is pivotably supported by pivot bearing 11 about a pivot axis 16. The lid 5 is pivotably supported about pivot axis 15. As shown in FIG. 2, the pivot axes 15 and 16 are approximately parallel to each other and, in the embodiment, approximately parallel to the axis of rotation of the wheels 3. The pivot axis 16 is positioned in the travel direction 66 of the working device 1 in front of the pivot axis 15. The stop switch 4 engages across the area of the pivot axis 15.

Figure 3:
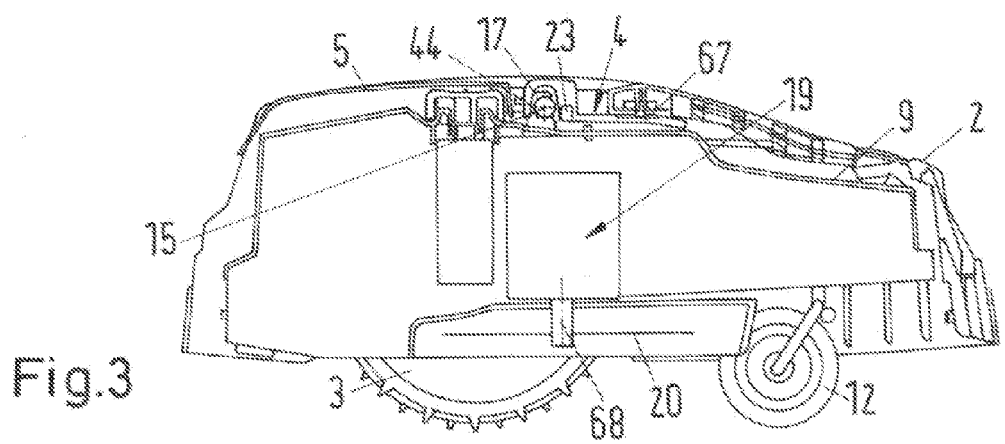
FIG. 3 is a schematic longitudinal section view of the working device of FIG. 1.

As shown in FIG. 3, in the housing 9 a drive device 19 is arranged which advantageously comprises an electric motor and which drives in rotation a tool of the working device 1, in the embodiment a knife 20. The axis of rotation 68 of the knife 20 in operation is approximately perpendicular when the working device 1 is standing on the ground so that the knife 20 moves in an approximately horizontal plane.

As shown in the section illustration of FIG. 3, the lid 5 has a bearing section 17 where the bearing about the pivot axis 15 is formed. The stop switch 4 comprises a section 44 that engages across the bearing section 17. The section 44 in cross-section is approximate U-shaped wherein, in the embodiment, the legs of the U are pointing downwardly when the working device 1 is traveling on the ground. The stop switch 4 comprises a plate-shaped base member 67 that is covered mostly by the cover 2. Approximately in the area in which the section 44 adjoins the base member 67, a magnet 23 is secured on the stop switch 4.

Figure 4:
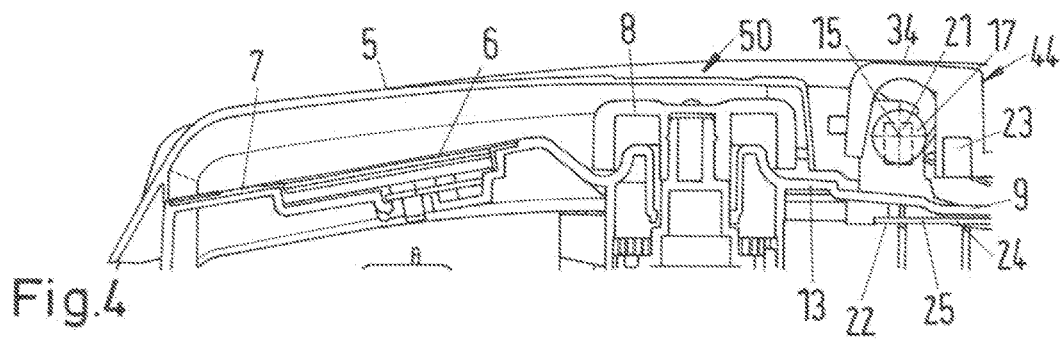
FIG. 4 is a detail view of FIG. 3 in the area of the lid.

As shown in the detail illustration of FIG. 4, in the housing 9 below the housing top part 13 a printed circuit board 25 is arranged that supports the Hall sensors 22 and 24. On the bearing section 17 of the lid 5, a first magnet 21 is arranged that interacts with the first Hall sensor 22, wherein the magnetic field of the first magnet 21 is measured by the first Hall sensor 22. The magnetic field of the second magnet 23 on the stop switch 4 is measured by the second Hall sensor 24. FIG. 4 shows the lid 5 in its closed position 50. In this position 50, the lid 5 covers the display 6, the operating elements 7 for the display 6 as well as the operating element 8 for the height adjustment of the knife 20. As also shown in FIG. 4, on the section 44 of the stop switch 4 an actuating section 34 is formed which can be pushed by the operator. The actuating section 34 is arranged above the bearing section 17 and is not covered by the cover 2.

Figure 5:
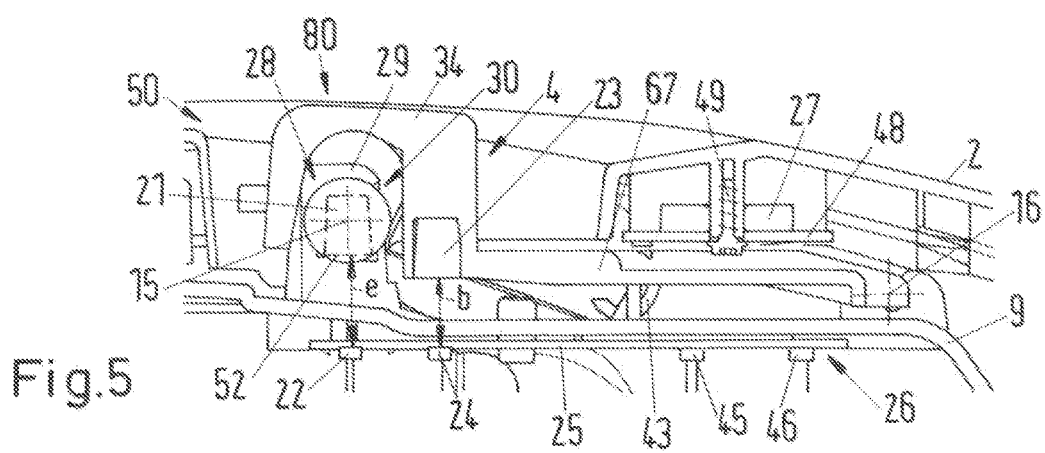
FIG. 5 is a detail view of FIG. 3 in the area of the stop switch.

FIG. 5 shows the area of the stop switch 4 of the working device 1 in detail. The first magnet 21 is arranged in the area of the pivot axis 15. In the embodiment, the pivot axis 15 intercepts the first magnet 21 approximately centrally. As shown in FIG. 5, the first magnet 21 has an end face 52 which in the closed position 50 of the lid 5 is facing the first Hall sensor 22. The end face 52 of the magnet 21 has a spacing e relative to the Hall sensor 22. The second magnet 23 has a spacing b relative to the second Hall sensor 24. In the embodiment, the spacing b is significantly smaller than the spacing e. The spacing b advantageously amounts to less than approximately 80% of the spacing e. The stop switch 4 is provided at its base member 67 with a spring element 43 which is supported on the housing 9 and pretensions the stop switch 4 in the non-actuated position 80, shown in FIGS. 4-6. As also shown in FIG. 5, the lid 5 is supported on a pivot bearing 28 on the housing 9.

Figure 6:
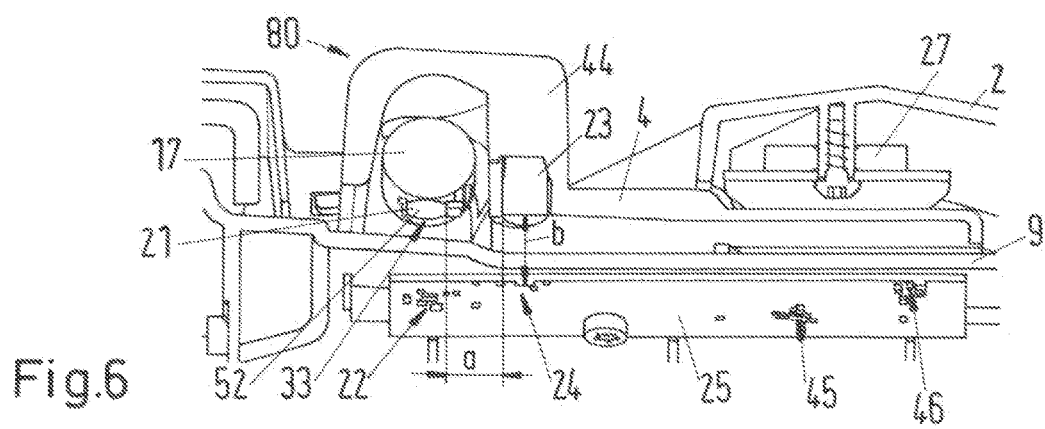
FIG. 6 is a perspective section illustration of the area of the stop switch.
Figure 19:
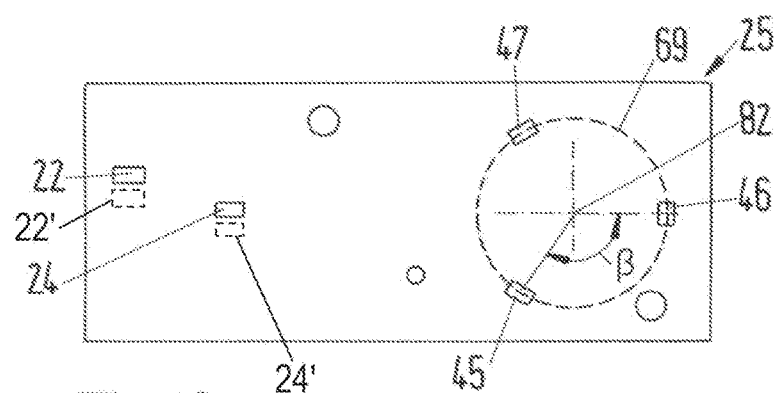
FIG. 19 is a plan view onto the printed circuit board of the working device.

On the cover 2, a third magnet 27 is secured. The third magnet 27 is arranged on the inner side of the cover 2 which is facing the housing 9 and is secured on the cover 2 by means of a washer 48, arranged underneath the third magnet 27, and of a screw 49. The printed circuit board 25 comprises further Hall sensors which are arranged in the area of the magnet 27. In the illustrations of FIGS. 5 and 6, a third Hall sensor 45 and a fourth Hall sensor 46 are visible. As can be seen in the plan view of the printed circuit board 25 in FIG. 19, a fifth Hall sensor 47 is additionally provided. The Hall sensors 45, 46 and 47 are arranged in the embodiment on an imaginary circle 69 and are arranged relative to each other so as to be displaced by an angle β about circular center point 82. In the embodiment, the angle β between two Hall sensors 45, 46 and 47 is 120°, respectively. When the cover 2 is moved parallel to the plane of the printed circuit board 25, the magnetic field of the third magnet 27 which is measured at the Hall sensors 45, 46 and 47 changes. Based on the change of the measured values of the Hall sensors 45, 46, and 47, it can be determined in which direction the cover 2 has been moved relative to the housing 9. Accordingly, the position of an obstacle that the working device 1 has hit can be detected. The Hall sensors 45, 46 and 47 together with the third magnet 27 define a detection device 26 for detection of the position of the cover 2. As is shown in FIGS. 5 and 19, all Hall sensors 22, 24, 45, 46, and 47 are arranged on a common printed circuit board 25.

In one embodiment variant, the magnetic field of at least one magnet 21, 23 is redundantly detected. As shown schematically in FIG. 19, two first Hall sensors 22, 22' can be arranged on the printed circuit board 25 that detect the magnetic field of the first magnet 21. Advantageously, alternatively or additionally, two second Hall sensors 24, 24' are provided which redundantly detect the magnetic field of the second magnet 23. Due to the redundant detection of at least one magnetic field, measuring errors or a defect of one of the Hall sensors 22, 22', 24, 24' of a sensor pair can be detected.

As shown in FIG. 6, the magnets 21 and 23 have only a minimal spacing a relative to each other. In this context, the magnets 21 and 23 are displaced relative to each other in the longitudinal direction of the pivot axis 15 (FIG. 5). The spacing a is advantageously less than approximately 5 cm, in particular less than approximately 3 cm. Accordingly, the printed circuit board 25 can be designed to be very small and the actuating section 34 of the stop switch 4 where the stop switch 4 upon actuation carries out the greatest pivot travel can be arranged in close proximity of the bearing section 17.

Figure 7:
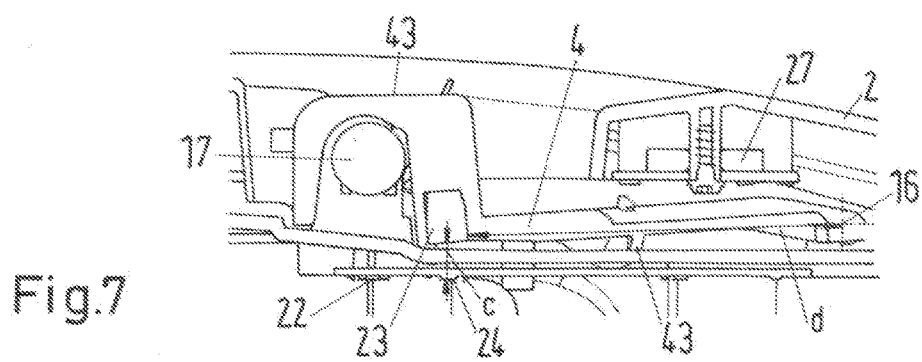
FIG. 7 is a section view in accordance with FIG. 5 for actuated stop switch.

FIG. 7 shows the stop switch 4 in its actuated position 81. The stop switch 4 upon actuation from the non-actuated position 80 into the actuated position 81 was pivoted about pivot axis 16. The second magnet 23 has a relatively large spacing d relative to the pivot axis 16. In the embodiment, the spacing d is greater than 5 cm, in particular greater than 8 cm. Accordingly, the magnet 23 has moved approximately perpendicularly to the printed circuit board 25. Accordingly, the spacing between the magnet 23 and the Hall sensor 24 has been reduced to a spacing c. The magnetic field that is measured by the Hall sensor 24 is therefore greater in the actuated position 81 of the stop switch 4 than in the non-actuated position 80 of the stop switch 4.

Figure 8:
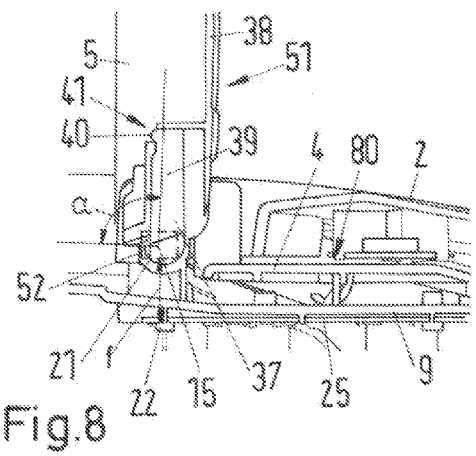
FIG. 8 is a section illustration of the bearing area of the lid with the lid in the open position.

FIG. 8 shows the lid 5 in its open position 51 and the stop switch 4 in its non-actuated position 80. Upon pivoting of the lid 5 into the open position 51, the first magnet 21 has been rotated about axis of rotation 15. In the open position 51 which is illustrated in FIG. 8, the first magnet 21 has a spacing f relative to the first Hall sensor 22 which in the embodiment is slightly greater than the spacing e. The spacings e, f can also be approximately identical. As shown in FIG. 8, the lid 5 has been pivoted from the closed position 50 about a pivot angle α into the open position 51. The pivot angle α amounts to approximately 70° to approximately 110°, preferably approximately 80° to approximately 100°. In the embodiment, the pivot angle is approximately 90°. The end face 52 of the first magnet 21 is facing away from the first Hall sensor 22 and is oriented sideward. Accordingly, the magnetic field of the first magnet 21 which is measured by the first Hall sensor 22 is significantly smaller than in the closed position 50 of the lid 5. The change of the magnetic field which results from pivoting of the magnet 21 about the axis of rotation 15 is thus significantly greater than the change of the magnetic field that results from change of the spacing b, c between the second magnet 23 and the second Hall sensor 24. Accordingly, the magnetic field changes can be differentiated well and the magnets 21 and 23 can be arranged at a very small spacing a relative to each other. Accordingly, the correlated Hall sensors 22 and 24 can be arranged at a minimal spacing relative to each other.

Figure 9:
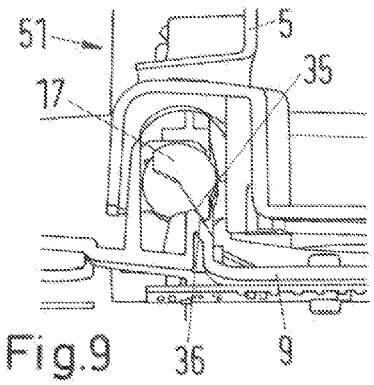
FIG. 9 is section view of a stop at the bearing section with the lid in the open position.

As can be seen in FIG. 9, on the bearing section 17 a stop 35 is arranged which projects radially outwardly and interacts with a stop surface 36 of the housing 9 in order to define the completely open position 51 of the lid 5.

Figure 10:
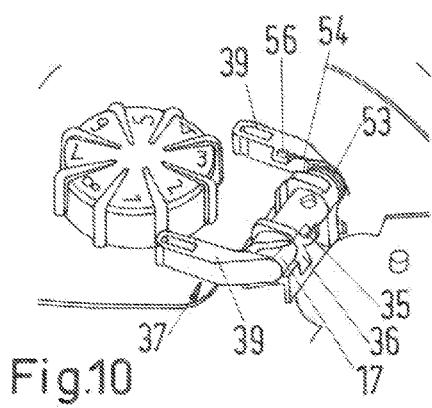
FIG. 10 is a perspective illustration of the housing with a first part of the lid arranged thereat.
Figure 11:
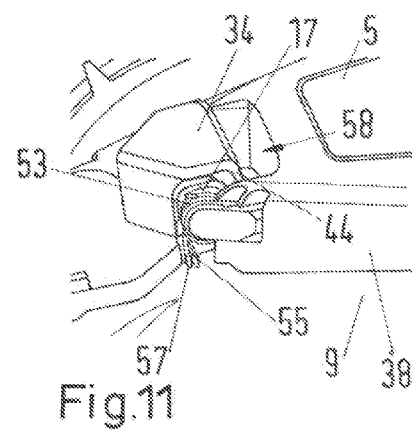
FIG. 11 is a perspective illustration in the area of the bearing section of the lid.

The lid 5 is comprised of a first part 37, shown in FIG. 10, and a second part 38, shown in FIGS. 14 and 15. The first part 37 comprises the bearing section 17 as well as two arms 39. The arms 39 serve for connecting the first part 37 to the second part 38. As shown in FIG. 10, on the bearing section 17 a spring 53 is arranged. A first leg 54 of the spring 53 is supported on a support 56 of the first part 37. In the embodiment, the support 56 is formed on an arm 39 of the first part 37. As shown in FIG. 11, the spring 53 comprises a second leg 55 which is supported on a support 57 on the housing 9. The spring 53 acts between the first part 37 and the housing 9 and pretensions the first part 37 in the direction of the completely open position 51 of the lid 5.

Figure 12:
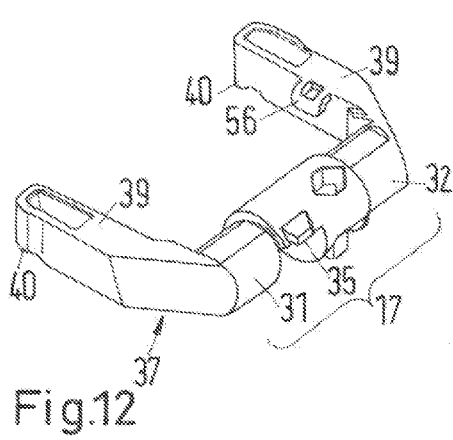
FIG. 12 is a perspective view of the first part of the lid.
Figure 13:
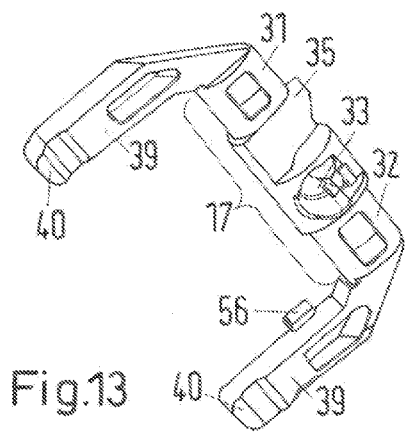
FIG. 13 is another perspective view of the first part of the lid.

FIGS. 12 and 13 show the first part 37 in detail. The bearing section 17 comprises two bearing locations 31 and 32 which are spaced apart from each other. The stop 35 is arranged between the bearing locations 31 and 32. The bearing section 17 extends from the first arm 39 to the second arm 39. The arms 39 project away from the bearing section 17 radially outwardly and are positioned in the same plane. As shown in FIG. 13, between the bearing locations 31 and 32 a recess 33 is provided which serves for receiving the first magnet 21. In FIG. 6, the magnet 21 is shown in the recess 33. The magnet 21 is advantageously snapped into the recess 33.

As also shown in FIGS. 12 and 13, each arm 39 comprises a locking projection 40 at its area facing away from the bearing section 17. The locking projection 40 serves for providing a locking connection of the first part 37 with the second part 38.

As shown in FIG. 14, the second part 38 forms the area of the lid 5 which covers the display 6 and the operating elements 7 and 8. Adjacent to the pivot axis 15 (FIG. 4), the second part 38 comprises two receptacles 83 into which an arm 39 can be inserted, respectively. The receptacles 83 are delimited on the side facing the housing 9 by locking arms 59 which at their free ends support locking rims 65. The locking rims 65 delimit each a locking opening 41 of the receptacles 83. Through the locking openings 41, the locking projection 40 projects, respectively, as shown in FIG. 8. In the area between the receptacles 83, the second part 38 has a cutout 58. In the area of the cutout 58, the bearing section 17 and the section 44 of the stop switch 4 are arranged in the mounted state of the lid 5, as shown in FIG. 11.

The second part 38 comprises at its inner side also a locking contour 42 which serves for locking with the housing 9. In the completely closed position 50 of the lid 5, the locking contour 42 is locked on the housing 9 and secures the lid 5 against the force of the spring 53 (FIGS. 10 and 11) in the closed position 50 (FIG. 2). When the second part 38 is pivoted about the pivot axis 15, the locking contour 42 disengages from the housing 9 and the spring 53 forces the lid 5 into its open position 51 until the stop 35 is resting on the stop surface 36 (FIG. 9). When the working device 1 is lifted at the second part 38 of the lid 5, the locking connection formed of the locking projection 40 and the locking rim 65 of the opening 41 releases. The locking connection is designed such that it releases when a force is applied that is less than the weight force of the working device 1, in particular less than the weight force of the working device 1 minus the weight of the second part 38 of the lid 5. When the connection between the first part 37 and the second part 38 is canceled, the first part 37 pivots due to the force of the spring 53 into the position which corresponds to the open position 51 of the lid 5. This is detected by the first Hall sensor 22. The drive device 19 and the propelling drives 18 are stopped when the first Hall sensor 22 recognizes that the lid 5 is open or the first part 37 is in a position which corresponds to the open position 51 of the lid 5. The propelling drives 18 and the drive device 19 are also stopped when the second Hall sensor 24 detects that the stop switch 4 is pushed or the Hall sensors 45, 46, and 47 detect a movement of the cover 2 relative to the housing 9. When the cover 2 is pushed downward, the cover 2 will contact the base member 67 of the stop switch 4 (FIG. 5) so that the stop switch 4 is actuated. In this situation, the drive device 19 and the propelling drives 18 are also switched off. It can also be provided to stop only the propelling drives 18 or only the drive device 19 when one of the Hall sensors 22, 24, 45, 46, 47 detects opening of the lid 5, actuation of the stop switch 4, or displacement of the cover 2.

FIG. 16 shows the bearing for the first part 37 of the lid 5 and the stop switch 4 on the housing 9 in detail. The pivot bearing 28 of the lid 5 is formed by receptacles 29 which are integrally formed on the housing 9. The receptacles 29 are open at a side which is facing the pivot axis 16 of the stop switch 4. The openings 30 of the receptacles 29 are facing the base member 67 of the stop switch 4, as shown in FIG. 5. By means of the openings 30, the bearing section 17 with its bearing locations 31 and 32 can be snapped into the receptacles 29. The stop switch 4 engages with its section 44 across the openings 30 and closes them off. In this way, the bearing section 17 cannot accidentally detach from the receptacles 29.

As also shown in FIG. 16, the housing 9 has bearing receptacles 60 which are a component of the pivot bearing 11 (FIG. 2) for the stop switch 4 and in which the stop switch 4 is pivotably supported about the pivot axis 16. In the area between the bearing receptacles 60 and the receptacles 29 for the bearing section 17, holders 61 are integrally formed on the housing 9 and are embodied as locking hooks. As shown in FIGS. 17 and 18, the stop switch 4 has two openings 84 in which one of the holders 16 locks, respectively. The holders 61 secure the stop switch 4 against the force of the spring elements 43 in its non-actuated position 80. Accordingly, the stop switch 4 cannot pivot further upwardly and release the openings 30 of the receptacles 29 (FIG. 16). Adjacent to the openings 84, there are webs 62 provided which extend in the direction of the housing 9 and form stops for the stop switch 4. Adjacent to the openings 84, spring elements 43 of the stop switch 4 are integrally formed. The stop switch 4 comprises at its base member 67 two outwardly projecting bearing sockets 63 which are provided for being supported in the bearing receptacles 60 (FIG. 16). As shown also in FIG. 18, the stop switch 4 comprises at the section 44 a receptacle 64 for the second magnet 23.

Figure 20:
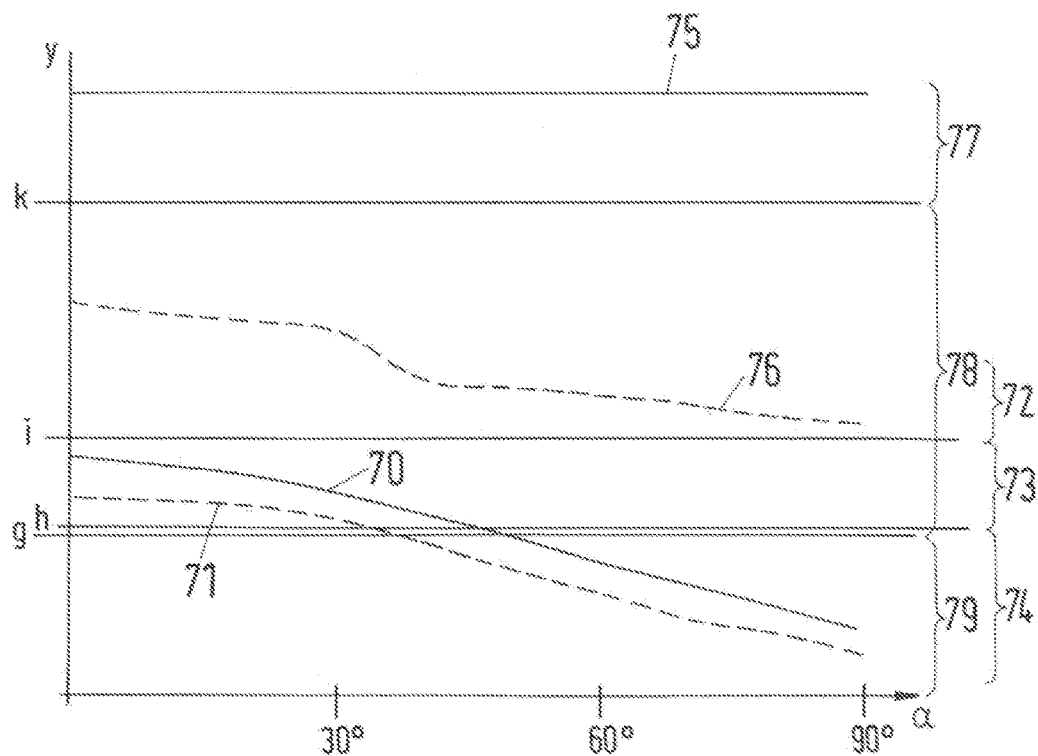
FIG. 20 is a schematic diagram of the measured values of the first and second Hall sensors as a function of the pivot angle of the lid.

FIG. 20 shows schematically the measured values y measured at the Hall sensors 22 and 24 as a function of the pivot angle α of the lid 5. The curve 70 shows the measured values y of the first Hall sensor 22 for the non-actuated position 80 of the stop switch 4, i.e., upon pivoting of the lid 5 from the position illustrated in FIGS. 5 and 6 into the position illustrated in FIGS. 8 and 9. The curve 71 shows the measured values y of the first Hall sensor 22 for actuated position 81 (FIG. 7) of the stop switch 4. As shown in FIG. 20, the position of the stop switch 4 has only a minimal influence on the measured values y that are provided by the first Hall sensor 22. However, the measured values y drop significantly upon pivoting of the lid 5, i.e., with increasing pivot angle α, and drop approximately linearly across a wide range of the pivot angle α. When the measured value measured by the first Hall sensor 22 is above a threshold value i in the range 72, the first Hall sensor 22 is detected as defective in a control unit of the working device 1 and the propelling drives 18 and the drive device 19 are switched off. When the measured value y is between the threshold value i and a second threshold value h in a range 73, the lid 5 is considered by the control unit as being in the closed position 50. The threshold value h can be selected suitably and in the embodiment is selected such that the lid 5 is considered to be closed for pivot angles α of significantly less than 50°. The threshold value h can be selected suitably in order to compensate manufacturing tolerances reliably and, at the same time, to detect a substantially open lid. The threshold value h is advantageously selected such that the operating elements 7 and 8 cannot be actuated at pivot angles α for which the lid 5 is considered to be in the closed position 50. When the measured value y of the first Hall sensor 22 is below the threshold value h in a range 74, the lid 5 is considered to be in the open position 51.

The curves 75 and 76 show measured values y of the second Hall sensor 24. The curve 75 shows the measured value y in actuated position 81 of the stop switch 4. As shown in FIG. 20, the measured value y is substantially constant and independent of the rotational position of the lid 5. The curve 76 shows the measured value y in the non-actuated position 80 of the stop switch 4. In the non-actuated position 80 of the stop switch 4 the measured values y are significantly smaller than for the actuated stop switch 4. At the same time, the measured value y is reduced upon increasing pivot angle α. For actuated position 81 of the stop switch 4, the measured value y measured by the second Hall sensor 24 is affected by the first magnet 21.

When the measured value y of the second Hall sensor 24 is above a threshold value k in the range 77, the control unit detects the stop switch 4 as being in the actuated position 81. When the measured value y is between the threshold value g and the threshold value k in a range 78, the stop switch 4 is considered to be in the non-actuated position 80. The threshold values g and h can be approximately identical. The threshold value g can also be above the threshold value h. When the measured value y of the second Hall sensor 24 is below the threshold value g in a range 79, the second Hall sensor 24 is considered to be defective.

The specification incorporates by reference the entire disclosure of European priority document 14 003 267.3 having a filing date of Sep. 20, 2014.

While specific embodiments of the invention have been shown and described in detail to illustrate the inventive principles, it will be understood that the invention may be embodied otherwise without departing from such principles.

What is claimed is:

1. A self-propelled working device comprising:
    at least one propelling drive;
    a housing;
    at least one operating element arranged on the housing;
    at least one pivot bearing arranged on the housing;
    at least one lid pivotably arranged on the housing so as to pivot about a pivot axis of the least one lid, wherein the at least one lid comprises a closed state in which the at least one lid covers the at least one operating element and an open state enabling access to the at least one operating element;
    the at least one lid comprising a bearing section interacting with the at least one pivot bearing, wherein the bearing section and the at least one pivot bearing define the pivot axis of the at least one lid;
    at least one first Hall sensor arranged in the housing and configured to monitor a pivot position of the at least one lid;
    at least one first magnet arranged on the bearing section of the at least one lid, wherein the at least one first magnet is rotated when the at least one lid pivots about the pivot axis of the at least one lid and wherein the magnetic field of the at least one first magnet is detected by the at least one first Hall sensor.

2. The working device according to claim 1, wherein at least two of the first Hall sensor are arranged in the housing and redundantly detect the magnetic field of the at least one first magnet.

3. The working device according to claim 1, further comprising:
    a stop switch arranged on the housing and comprising at least one second magnet;
    at least one second Hall sensor arranged in the housing, wherein a position of the stop switch is monitored by the at least one second Hall sensor, wherein the at least one second Hall sensor detects the magnetic field of the at least one second magnet.

4. The working device according to claim 3, wherein at least two of said second Hall sensor are arranged in the housing that redundantly detect the magnetic field of the at least one second magnet.

5. The working device according to claim 4, wherein the at least one second magnet has a spacing of less than 5 cm relative to the at least one first magnet.

6. The working device according to claim 3, further comprising a printed circuit board arranged in the housing, wherein the at least one first Hall sensor and the at least one second Hall sensor are arranged on the printed circuit board.

7. The working device according to claim 3, wherein the stop switch comprises a section that at least partially extends across the bearing section of the at least one lid.

8. The working device according to claim 7, wherein the pivot bearing comprises a receptacle comprising an opening and wherein the stop switch at least partially covers the opening of the receptacle.

9. The working device according to claim 6, further comprising a movably supported cover and a detection device arranged in the housing, wherein a position of the cover is monitored by the detection device and wherein the detection device comprises at least one third Hall sensor.

10. The working device according to claim 9, further comprising a printed circuit board arranged in the housing, wherein the at least one first Hall sensor, the at least one second Hall sensor, and the at least one third Hall sensor are arranged together on the printed circuit board.

11. The working device according to claim 1, wherein the bearing section comprises at least two bearing locations and is pivotably supported by the at least two bearing locations, wherein the at least one first magnet is arranged between the at least two bearing locations.

12. The working device according to claim 1, wherein the bearing section comprises a recess and the at least one first magnet is arranged in the recess.

13. The working device according to claim 1, wherein the at least one lid is supported by a spring loading the at least one lid in the direction of the open state.

14. The working device according to claim 1, wherein on the bearing section a stop is formed which interacts with the housing and defines a completely open position of the at least one lid.

15. The working device according to claim 1, wherein the at least one lid carries out a pivot travel about a pivot angle of approximately 70° to 110° between a completely closed position and a completely open position.

16. The working device according to claim 1, wherein the at least one propelling drive is switched off when the at least one lid is not completely closed.

17. The working device according to claim 16, further comprising a drive device drivingly connected to a tool of the working device, wherein the drive device is switched off when the at least one lid is not completely closed.

18. The working device according to claim 1, further comprising a drive device drivingly connected to a tool of the working device, wherein the drive device is switched off when the at least one lid is not completely closed.

* * * * *